No. 827,941. PATENTED AUG. 7, 1906.
J. J. POTTER.
NUT LOCK.
APPLICATION FILED AUG. 18, 1905.
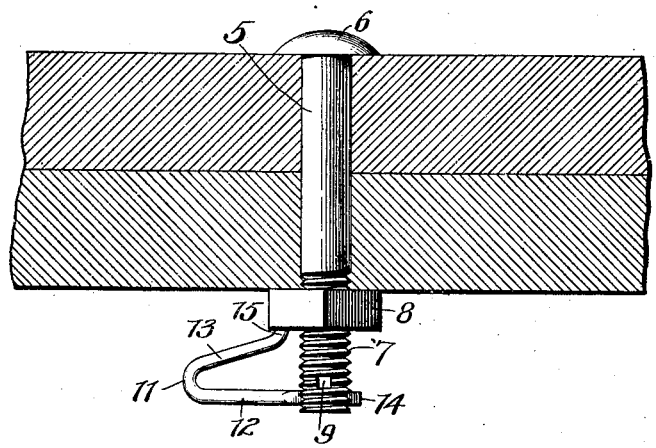
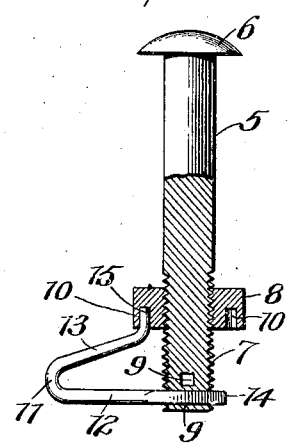
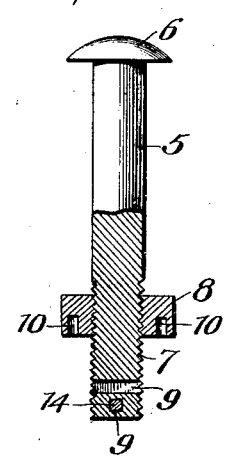
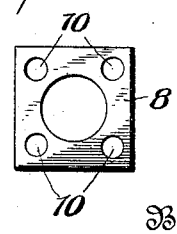
J. J. Potter, Inventor
Witnesses
By
Attorney

UNITED STATES PATENT OFFICE.

JAMES J. POTTER, OF STAUNTON, VIRGINIA.

NUT-LOCK.

No. 827,941.   Specification of Letters Patent.   Patented Aug. 7, 1906.

Application filed August 18, 1905. Serial No. 274,754.

*To all whom it may concern:*

Be it known that I, JAMES J. POTTER, a citizen of the United States, residing at Staunton, in the county of Augusta and State of Virginia, have invented a new and useful Nut-Lock, of which the following is a specification.

This invention relates to means for locking nuts against turning on bolts.

The primary object is to provide a simple structure of a novel nature whereby a nut can be positively locked against movement on a bolt, thereby insuring the parts being properly held by such bolt, said structure at the same time not injuring the bolt or nut and permitting the tightening, loosening, or removal of the latter without damage thereto or to the bolt.

The preferred embodiment of the invention is illustrated in the accompanying drawings, wherein—

Figure 1 is a sectional view through two members held together by a bolt having the improved locking means. Fig. 2 is a longitudinal sectional view through the bolt. Fig. 3 is a similar view at right angles to Fig. 2. Fig. 4 is a plan view of the nut.

Similar reference-numerals designate corresponding parts in all the figures of the drawings.

In the embodiment illustrated a bolt is employed comprising a shank 5, having at one end a head 6 and being threaded upon its other end, as shown at 7. A nut 8 is screwed upon the threaded portion 7. The particular form of the bolt and nut is not important, as the locking means hereinafter described is applicable to bolts of various types.

The threaded end of the bolt is provided with one or more sockets 9, two being shown in the present case, which sockets are disposed at right angles to each other and are angular in cross-section. The outer side of the nut 8 has a series of recessed seats 10. A locking device is provided in the form of a bowed spring-wire 11, one of the arms 12 of which is longer than the other arm 13 and in the present embodiment terminates in an angular end 14, that detachably fits in either of the sockets 9. The other arm 13 is disposed in angular relation to the arm 12, terminates short of the bolt, and is interposed between the nut and arm 12. The arm 13 is provided with an offset terminal 15, that is arranged to engage in any of the recessed seats 10, and consequently, the locking device 11 being held against turning by its engagement with the bolt, will prevent the turning of the nut 8. At the same time the interlocking engagement between the arm 13 and the nut will prevent the longitudinal movement of the locking device, and consequently prohibit the detachment of the arm 12 from the bolt.

It will thus be seen that an exceedingly simple device is provided which will securely lock a nut against turning on a bolt, and while it necessitates the provision of sockets and recesses in the bolt and nut the same do not in any manner affect the operative qualities thereof, and the expense of manufacture will be but little more than with the ordinary bolt. With this structure, moreover, the bolt can be tightened, loosened, or removed, as it is only necessary to spring the arm 13 so that the terminal 15 will disengage from the recess, whereupon the locking device 11 can be removed and the nut operated in the ordinary manner.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a nut-lock, the combination with a bolt having a threaded end and a transverse socket in the same, said socket having a closed outer side, of a nut screwed upon the bolt and having recessed seats in its outer side, and a locking device comprising a doubled spring, the main body of which is disposed at one side of the bolt, one arm of said spring being longer than the other and detachably fitting in the bolt-socket, the other arm terminating short of the bolt and being interposed between the first-mentioned arm and the nut, said interposed arm having an offset free terminal disposed in angular relation to said first-mentioned arm and located at one side of the bolt, said terminal detachably engaging in any of the said seats of the nut.

2. In a nut-lock, the combination with a bolt having a threaded end and a transverse socket in the same, said socket being angular in cross-section and having a closed outer side, of a nut screwed upon the bolt and having recessed seats in its outer side, a locking device comprising a doubled spring, one arm of which has a terminal that is angular in cross-section and detachably fits in the angular socket of the bolt, being thereby held against rotation, the other arm terminating short of said bolt and having an offset end that detachably engages in any of the seats of the nut.

In testimony that I claim the foregoing as my own I have hereto affixed my signature in the presence of two witnesses.

JAMES J. POTTER.

Witnesses:
    JOHN H. SIGGERS,
    BLANCHE J. KALDENBACK.